March 6, 1956 P. J. ABEL 2,737,563
METHODS OF AND APPARATUS FOR MAKING TUBES
Filed May 20, 1950 4 Sheets-Sheet 1
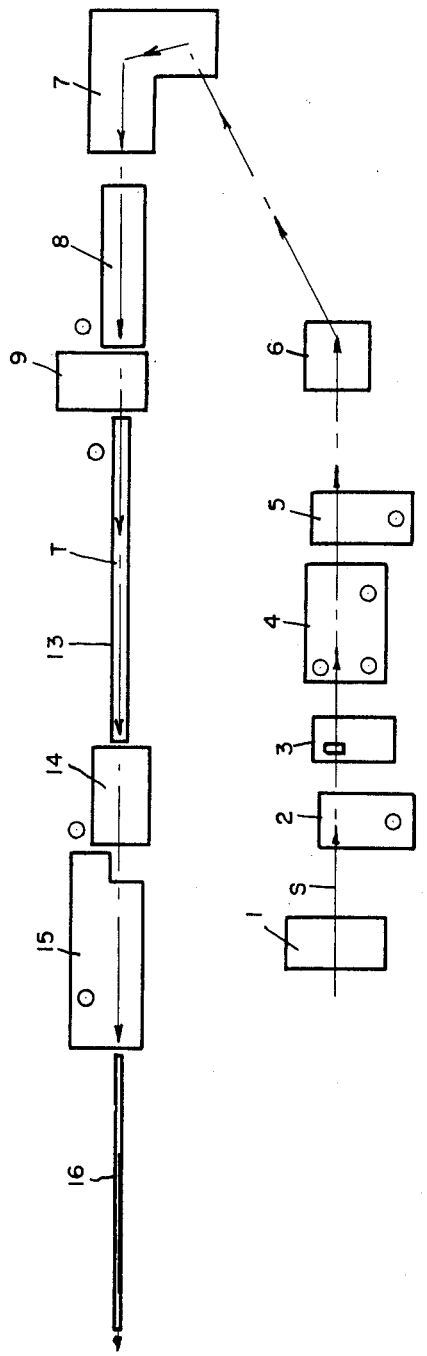
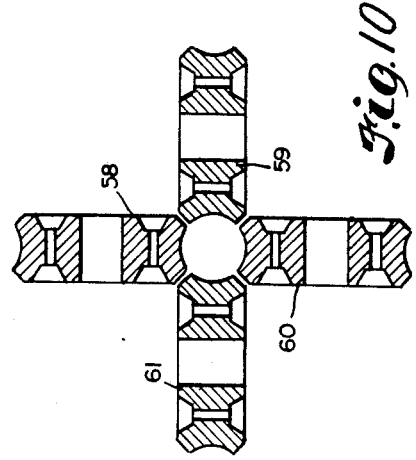
INVENTOR.
PAUL J. ABEL
BY
Oberlin & Limbach
ATTORNEYS March 6, 1956  P. J. ABEL  2,737,563
METHODS OF AND APPARATUS FOR MAKING TUBES
Filed May 20, 1950  4 Sheets-Sheet 2

INVENTOR.
PAUL J. ABEL
BY
Oberlin & Limbach
ATTORNEYS.

March 6, 1956 P. J. ABEL 2,737,563
METHODS OF AND APPARATUS FOR MAKING TUBES
Filed May 20, 1950 4 Sheets-Sheet 3

INVENTOR.
PAUL J. ABEL
BY
Oberlin & Limbach
ATTORNEYS.

March 6, 1956  P. J. ABEL  2,737,563
METHODS OF AND APPARATUS FOR MAKING TUBES
Filed May 20, 1950  4 Sheets-Sheet 4

INVENTOR.
PAUL J. ABEL
BY
Oberlin & Limbach
ATTORNEYS.

United States Patent Office 2,737,563
Patented Mar. 6, 1956

2,737,563

METHODS OF AND APPARATUS FOR MAKING TUBES

Paul J. Abel, Cleveland, Ohio, assignor to The Yoder Company, Cleveland, Ohio, a corporation of Ohio Application May 20, 1950, Serial No. 163,189

3 Claims. (Cl. 219—6)

This invention relates as indicated to an improved method and apparatus for the manufacture of metal tubing and more particularly to such method and apparatus employing an induced high frequency flux field as the heating means whereby abutting edge portions of a preformed metal strip may be heated to welding temperature.

Tubing is at the present time manufactured by several different processes such as the hot process wherein flat strips of metal called "skelp" are hot rolled to desired width and thickness and then, after being brought to a welding temperature, are pulled through a "bell" or a pair of rolls to form the skelp into tubular shape and simultaneously to weld the abutting edges thereof together by forcing the same together. Tubing is also manufactured by piercing heated cylindrical billets and then passing the latter through a series of special rolls for the purpose of reducing them in successive stages to the desired internal and external diameters, the tube becoming progressively elongated. These two processees are suitable for large scale operations in the manufacture of tubular products of considerable thickness. The seamless method and also the extrusion method are additionally advantageous in the manufacture of pipe and tubing from ferrous and non-ferrous metals which are not readily weldable.

However, for weldable metals in thicknesses such as are required for most practical purposes, that is, for thicknesses which can readily be cold-formed prior to welding, the electric resistance-weld process has in recent years rapidly taken the place of all other methods. In the well-known Yoder electric resistance-weld tube mills now extensively employed, flat strip is withdrawn from a strip uncoiler and passed through a series of cold-forming rolls to shape such strip to tubular form with the two edges of the strip opposed to each other and slightly spaced. As the formed tube leaves the forming machine, it passes between a pair of squeeze rolls operative to force the two abutting edges together. A pair of rotary electrodes are positioned above the tube at this station, their sharp peripheral edges respectively engaging the tube to either side of the seam. The resistance to passage of the electric current across the seam melts such abutting edges for an instant, rendering the pressure of the squeeze rolls effective to press such edges together and unite the same by complete fusion into one homogeneous mass of metal which is actually found to be stronger than the unwelded part of the tube wall. Ordinarily, both an external and internal bead will be formed along the line of the weld. Such external bead may be removed by means of an appropriate cutting tool at a following station, but removal of the internal bead as well as any internal spatter which may have occurred is somewhat more of a problem. For many purposes, however, such internal bead and spatter is of no consequence and does not affect the marketability of the tubing.

The welded tube now continues through a cooling unit where it is rapidly cooled by a series of water curtains within a cylindrical housing. From the cooling unit the tube progresses through a sizing and straightening mill to an automatic cut-off, usually a flying shear, where the length of continuously advancing tubing is automatically cut into desired sections.

Despite the commercial success of the above-described method of producing cold-formed electric resistance-welded tubing, certain problems continue to be encountered. Although cost per foot of tubing thus produced compares favorably with the cost of tubing produced by other methods, the actual rate of production tends to be rather slower, the weld strength normally being in inverse ratio to the welding speed. For certain uses such as electrical conduit, for example, a rough internal bead or spatter is objectionable and additional operations to remove the same are both costly and troublesome. The rotary electrodes and associated equipment, while very satisfactory when properly maintained, require a certain degree of attention, such electrodes, particularly, requiring to be cooled by means of an appropriate liquid coolant and also requiring to be removed and trimmed from time to time. If different sizes of tubing are to be produced by the same mill, then corresponding pairs of electrodes must be kept in stock and substituted or else the present pair trimmed for each change in tube size.

It is therefore a primary object of my invention to provide cold-formed tube welding apparatus wherein the same electrical heating means is adapted for employment in the manufacture of a wide range of tube sizes.

Another object is to provide a tube mill employing such electric heating means which will be effective to heat only the opposed edge portions of the metal strip to welding temperature even when such edge portions are slightly spaced from each other and not physically abutting.

Still another object is to provide tube welding apparatus and a method of welding whereby tubing may be formed without internal spatter and, if desired, without an internal bead.

A further object is to provide such electric welding apparatus which will not require the application of a liquid or other coolant to the tube adjacent the point of welding.

It is also an object to provide such welding apparatus and method of welding adapted to the continuous production of tubing at a rate in excess of 200 feet per minute.

Other objects of my invention will appear as the description proceeds.

To the accomplishment of the foregoing and related ends, said invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

In said annexed drawing:

Fig. 1 is a diagrammatic layout or flow sheet illustrating the sequence of operations which may be employed in accordance with my invention in the manufacture of continuous lengths of tubing from strip stock;

Figs. 9 and 10 illustrate in section certain alternative arrangements of cooperating squeeze rolls;

Fig. 11 is a fragmentary detail view in section of a modified form of such an upper squeeze roll;

Figure 3:
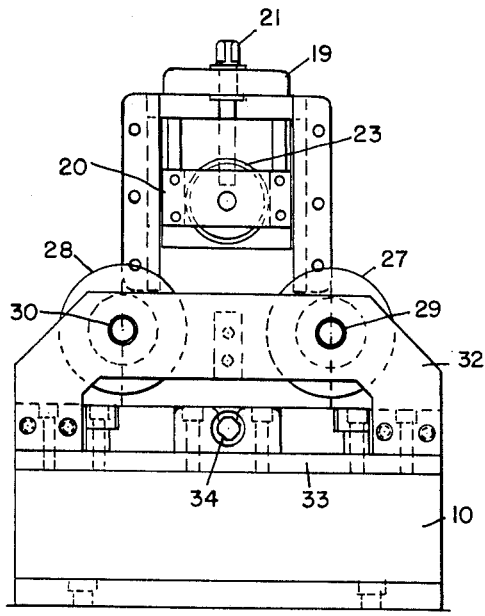
Fig. 3 is a front elevational view of the apparatus of Fig. 2.
Figure 2:
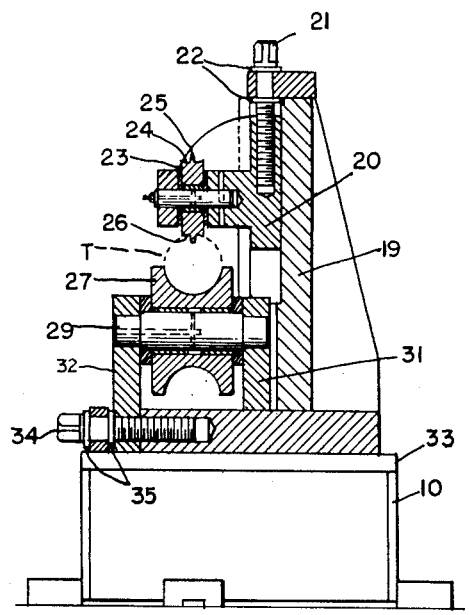
Fig. 2 is a side elevational view of a preferred form of guide means adapted to be employed immediately following the forming mill prior to heating the opposed edges of the strip for welding.
Figure 4:
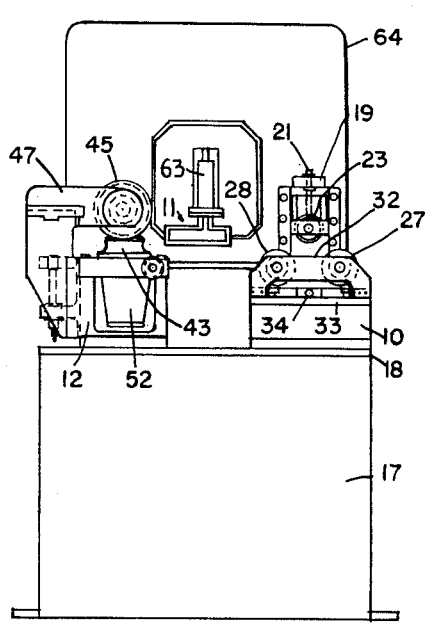
Fig. 4 is a front elevational view of the welding station showing the guide means of Figs. 2 and 3, the induction heating means, and the squeeze rollers effective to force the opposed heated edges of the work together in welding engagement.
Figure 5:
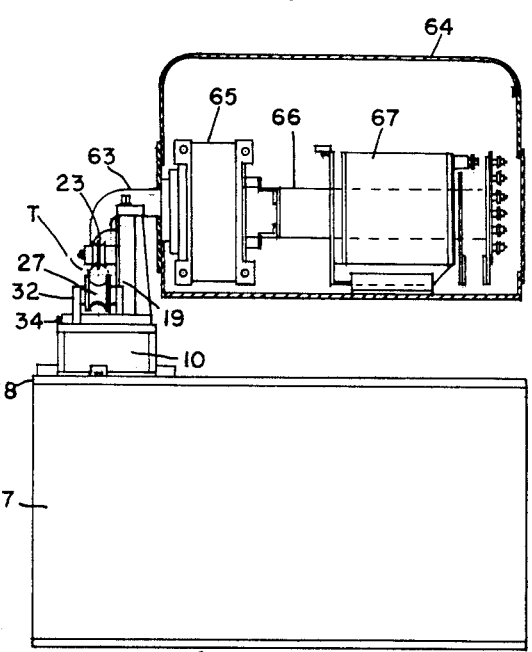
Fig. 5 is a side elevational view of the apparatus of Fig. 4.

Referring now more particularly to said drawing and especially Fig. 1 thereof, it will be seen that the metal strip S is withdrawn from an uncoiler 1 by means of the power driven pinch rolls of pinch roll stand 2 and thence passes to a square shear 3 where the leading end of such strip is cropped. Such leading end will then be joined to the trailing end of a preceding length of strip at butt welder and flash trimmer 4 so that the tube forming the welding operation may continue without interruption. Pinch rolls of roll stand 5 advance such strip which is here shown as now reversing its direction through action of stock travel reversing means 6 and 7. The strip will here desirably be festooned to provide slack permitting the above-described butt welding operation without the necessity of temporarily stopping the advance of the strip to the rolls of the cold-forming mill 8. Such latter mill, of well-known design, forms a strip to generally circular cross-section (or to such other shape as may be desired) with the two parallel edges of the strip S opposed to one another but with a narrow open seam therebetween. The tubing thus formed now passes to the welder 9 being sequentially subjected to the action of guide means 10, high frequency induction means 11, and squeeze roll assembly 12 comprising such unit. The tubing T thus formed continues through cooling unit 13, sizing and straightening mill 14, and rotary shear cut-off station 15 in succession, being delivered to run-out table 16 for bundling.

The various units comprising the above-described assembly are of well-known conventional type and accordingly need not be described in detail, with the exception of the welding unit 9 with which the present invention is particularly concerned. The construction and operation of such welding unit will therefore be fully explained below.

Referring now more particularly to Figs. 2–5 inclusive of the drawing, such welding unit comprises a welded box frame base 17 having an upper deck 18 on which are mounted guide unit 10 and squeeze roller unit 12 near the forward edge thereof. Such two units may be thus mounted in ways (not shown) to permit adjustable positioning of the same relative to one another and to the induction heating means 11 interposed therebetween.

Such guide means 10 comprises a vertical slide-way 19 with slide 20 mounted for vertical reciprocation therein. The vertical position of such slide may be adjusted by means of screw 21 and preserved by means of lock nuts 22. Carried by slide 20 is a guide roller 23 pivotally mounted on a horizontal axis transversely of the axis of tubing T as the latter passes through the machine. Roller 23 has a generally concave outer periphery 24, except for an upstanding peripheral rib 25 centrally thereof. The curve of such concave surface is selected to conform to the outer curvature of tubing T and rib 25 tapers somewhat toward its outer periphery to ensure entry into seam 26 of tubing T. Such guide roller is thereby effective to ensure that such tubing will now continue on its way with such seam uniformly in uppermost position.

A pair of tube supporting rollers 27 and 28 are positioned below and to either side of roller 23 and are contoured to conform to the lower half of the circumference of such tubing. These rollers 27 and 28 are journalled on shafts 29 and 30 and supported by brackets 31 and 32. Bracket 32 is removable to provide for replacement of rollers 27 and 28 by similar rollers of different sizes to accommodate different sizes of tubing, and vertical slideway 19 is gibbed in transverse ways 33 to permit corresponding lateral adjustment in the position of guide roller 23. Adjusting screw 34 and lock nuts 35 are operative to determine such adjusted position of slideway 19.

Figure 7:
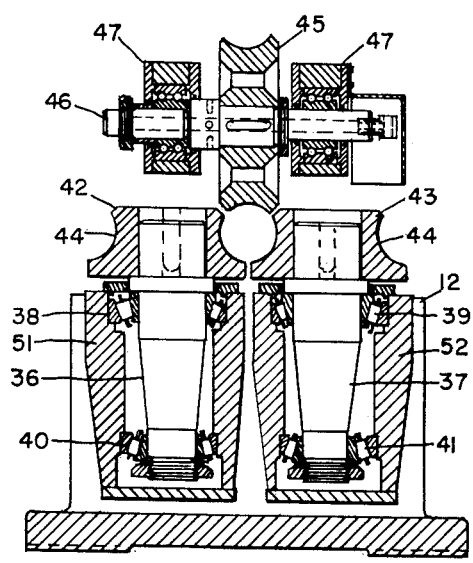
Fig. 7 is a vertical sectional view taken along the line 7—7 on Fig. 6 better to show the manner in which such squeeze rolls cooperate.
Figure 6:
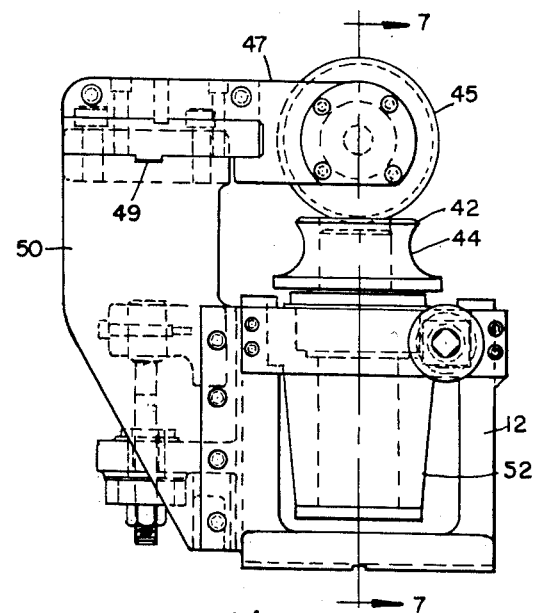
Fig. 6 is a detail side elevational view on an enlarged scale of the squeeze rollers and their mounting shown in Fig. 4.
Figure 8:
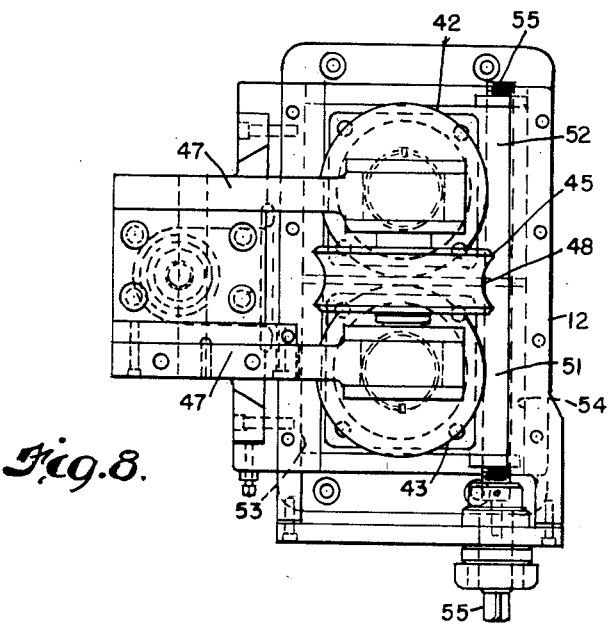
Fig. 8 is a top plan view of the roll unit of Figs. 6 and 7.

The squeeze roll unit 12 comprises a pair of vertical shafts 36 and 37 journalled in thrust bearings 38, 39, 40 and 41 arranged transversely of the path of travel of tubing T. Keyed to the upper ends of such respective shafts are squeeze rollers 42 and 43 having identical contoured work-engaging peripheries 44 adapted to engage the tubing therebetween and force the opposed heated edges of the seam together in welding engagement. These two rollers, as shown in Figs. 6 and 7, are shaped together to engage substantially the entire periphery of the tubing, except for the upper 25% or thereabouts of such periphery. A third roller 45 is journalled on a transverse axis 46 in upper bracket 47 directly above the upper ends of such shafts 36 and 37 so that the concave outer periphery 48 of roller 45 is adapted to engage the upper portion of tubing T on the same circumferential line as rollers 42 and 43. Such concave surface of roller 45 being thus shaped and dimensioned to conform to tubing T together with rollers 42 and 43 substantially completely embraces such tubing. Rolls 42 and 43 may be removed and replaced with different sizes of rolls to accommodate different sizes of tubing, as may also roll 45. The near outrigger bracket 47 for roll 45 (as viewed in Fig. 6) is mounted in ways 49 on main bracket 50 for lateral adjustment to accommodate various sizes of rolls. The mounts 51 and 52 in which shafts 36 and 37 are respectively journalled are likewise carried in transverse guideways 53, 54, and threadedly engage oppositely threaded portions of adjusting screw 55. Turning of such screw is accordingly effective to shift rolls 42, 43, toward and away from one another.

Figs. 9 and 10 show other arrangements of squeeze rolls which may be employed in some cases, although the arrangement illustrated in Figs. 6 and 7 will usually be preferred. In Fig. 9 two identical upper and lower rolls 56 and 57 are employed in place of the three rolls above described, and in Fig. 10 four identical rolls 58, 59, 60, and 61 are employed, in each case the assembly of squeeze rolls completely encompassing the circumference of the tubing. Further modified arrangements of such rolls will be apparent to those skilled in the art. In Fig. 11 the upper roll 45 is shown with a narrow peripheral groove 62 in the center of the concave work-engaging face 48. Such groove is designed to receive the outer bead which may be formed along the welded seam when the abutting edges thereof are forced together by squeeze rolls 42 and 43, for example. By shaping the portions of concave face 48 adjacent such groove on a slightly greater arc of curvature than the remainder of the work-engaging faces, the abutting edges of the tubing may be forced together in a slightly outward direction so that no internal bead will be formed but only an external bead. Tubing thus formed will meet the specifications promulgated for electrical conduit, for example. The outer bead may be removed, if desired, with very little difficulty as above explained.

The induction heating means 11 is carried by a depending bracket 63 mounted on the front face of housing 64 containing the usual transformer 65, bus bars 66, and capacitors 67 employed to produce the high frequency current required for such inductor. This transformer-capacitor assembly is of well-known construction, the details of which form no part of the present invention. It will preferably be mounted both for vertical adjustment and adjustment parallel to the path of travel of the work.

Figure 12:
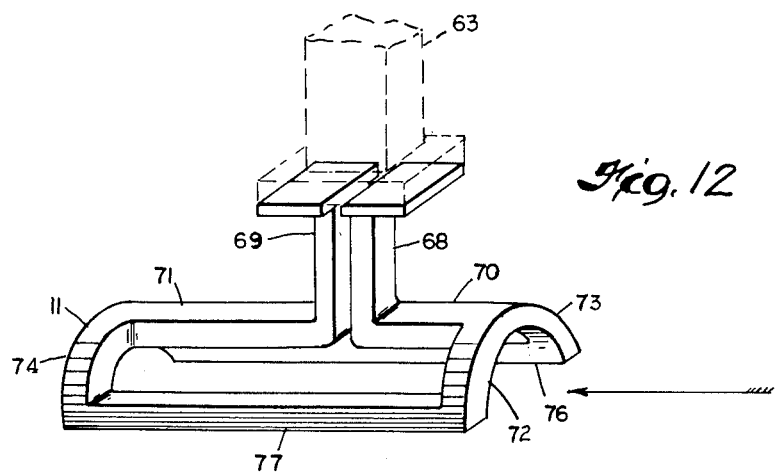
Fig. 12 is a perspective detail view of one form of electrical induction means.
Figure 13:
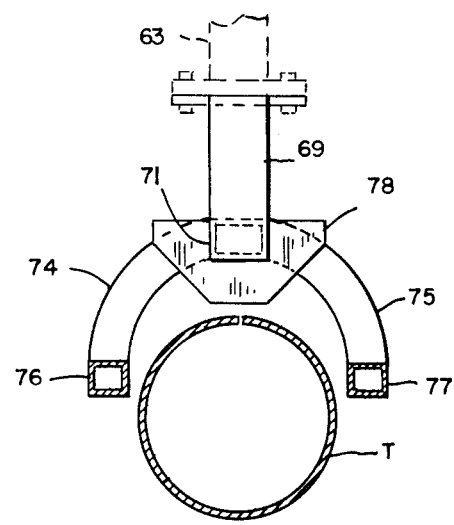
Fig. 13 is a vertical tranverse section taken through such induction means.

The high frequency inductor unit proper 11 is detachably mounted at the front of such housing, carried by depending bracket 63, and comprises a fairly simple single turn coil modified in that for part of the turn such coil has two parallel branches. A typical unit is illustrated in Figs. 12 and 13, having vertical terminal legs 68 and 69 mounted on bracket 63 and joining the central horizontal portions 70 and 71 near the center of the unit. The current flow is thus from one such terminal leg 68, 69, through the corresponding central horizontal portion 70, 71, and then divided between arcuate downturned leg portions 72, 73 and 74, 75; thence passing back through lower spaced horizontal portions 76, 77 to the other end of the unit and corresponding terminal leg. As best shown in Fig. 13 the spaced horizontal portions are disposed to embrace fairly closely the upper portion of the tubing including seam 26.

Figure 14:
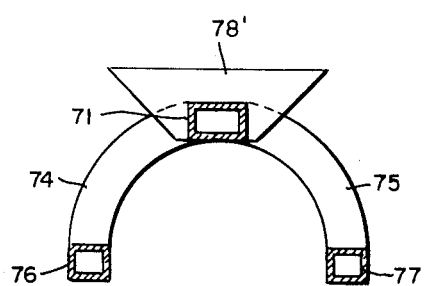
Fig. 14 is a generally similar view of a modified form.

Central horizontal portions 70, 71 are the most important elements of the unit, the sum of the currents in portions 76, 77 passing therethrough, and they will desirably be provided with closely spaced thin fins or laminations of iron 78 (Fig. 13) at right angles to such conductors and press fitted thereon. Such laminations are individually coated with shellac to insulate the same. Various modifications of shape, such as laminations 78' shown in Fig. 14, for example, will occur to those skilled in the art, likewise serving the purpose of concentrating the power of the inductor unit along the opposed edge portions of seam 26. Such portions are brought to welding temperature by the high frequency current induced therein whereas the remainder of the tube is not nearly so highly heated. The copper conductor elements of the inductor are of hollow rectangular cross-section so that the unit may be water cooled.

Ordinarily only about three-sixteenths of an inch of the metal on each side of the seam is heated to welding temperature (on the order of 2,300–2,600° F. for low carbon steel tubing) by means of a high frequency current. Depending on the particular application, the inductor will ordinarily operate at frequencies from about 3,000 to about 10,000 cycles. By appropriately modifying the shape of the inductor unit the seam edges of two parallel lengths of tubing may be heated simultaneously, the tubing preferably being arranged with their respective seams closely adjacent one another.

After passing inductor unit 11 the tubing immediately passes between the rolls of squeeze roll unit 12 (Fig. 4) to force the heated edges of the seam together in welding engagement. If the rolls are shaped as shown in Fig. 7, but with upper roll 45 modified as shown in Fig. 11, the finished tubing may be formed with substantially no internal bead (suitable for electric conduit, for example) and the outer bead formed may be trimmed away. If an internal bead is of no consequence but a smooth exterior is desired (as for tubular metal furniture and the like) then rolls such as those shown in Fig. 10 may be employed. Tubing of low carbon steel, stainless steel, aluminum, and copper may be formed and welded at a rate well in excess of 200 ft./min., a marked improvement over electric resistance welding utilizing rotary electrodes. The rate of production is over four times that achieved by gas welding methods. Once the apparatus is set up, long trouble-free runs may be expected with a minimum of maintenance in contrast to the care and attention required to be given rotary electrodes and associated equipment. A superior product without internal bead or spatter may be obtained.

Rolls 42, 43 and 45 may be of non-magnetic material, but this is ordinarily not necessary in my construction, particularly when welding the usual carbon steels. When welding stainless steel, for example, the seam edges may desirably be held together while passing the inductor, and the squeeze rolls should then be of bonded sapphire or like non-magnetic and non-metallic material, particularly if located directly under the inductor. When welding carbon steels, an open seam is preferred in the region of the inductor since control of the operation is facilitated and heating of an unnecessarily wide portion of the strip on each side of the seam is avoided.

Other modes of applying the principle of the invention may be employed, change being made as regards the details described, provided the features stated in any of the following claims or the equivalent of such be employed.

I therefore particularly point out and distinctly claim as my invention:

1. In apparatus for the continuous manufacture of welded tubing including forming means operative to form a continuous metal strip to generally tubular form with the edges of such strip closely opposed in a continuous longitudinal seam, and means operative continuously axially to advance the same; means operative to heat only such seam edges to welding temperature, means operative to force such edges together in welding engagement, and guide means adapted preliminarily properly to position such seam relative to said heating means comprising a pair of peripherally grooved rollers adapted sequentially to engage and support such tubing, another grooved roller diametrically opposed to said first rollers and intermediate the same, such grooves being shaped to conform to the transverse contour of such tubing passing between said rollers, and a tapered peripheral radially extending flange on said intermediate roller adapted to enter such seam.

2. In tube welding apparatus including means operative to heat the opposed edges of a longitudinal seam to welding temperature as such tube is advanced, opposed squeeze rolls adapted to engage such tube to force such heated seam edges together in welding engagement, said rolls being contoured to conform to the outer periphery of such tube, and another roll, together with said first rolls substantially encompassing such tube, contoured generally to conform to the outer periphery of such tube but having a transverse work engaging face on an arc of slightly greater diameter than the faces of said first rolls and provided with a peripheral groove in such face positioned to coincide with such seam to receive an outwardly extruded bead.

3. In apparatus for the continuous manufacture of welded tubing including forming means operative to form a continuous metal strip to generally tubular form with the edges of such strip closely opposed in a continuous longitudinal seam, and means operative continuously axially to advance the same, the combination of electric induction means operative to heat such formed strip to welding temperature in the region of such seam, and nonmagnetic bonded sapphire squeeze rolls arranged and disposed to force such opposed seam edges together in welding engagement.

References Cited in the file of this patent

UNITED STATES PATENTS

| | | |
|---|---|---|
| 1,915,082 | Blakeslee | June 20, 1933 |
| 2,083,034 | Mishler | June 8, 1937 |
| 2,181,445 | Adams, Jr. | Nov. 28, 1939 |
| 2,196,106 | Darner | Apr. 2, 1940 |
| 2,205,424 | Leonard, Jr. | June 25, 1940 |
| 2,335,894 | Adams, Jr. | Dec. 7, 1943 |
| 2,460,687 | Fuchs | Feb. 1, 1949 |
| 2,493,950 | Dow et al. | Jan. 10, 1950 |
| 2,575,381 | Colby | Nov. 20, 1951 |
| 2,582,955 | Body | Jan. 22, 1952 |
| 2,582,963 | Cachat | Jan. 22, 1952 |
| 2,632,840 | Sorensen | Mar. 24, 1953 |